United States Patent
Bao et al.

(10) Patent No.: US 11,433,762 B1
(45) Date of Patent: Sep. 6, 2022

(54) DEVICE FOR SUPPLYING AMMONIA WITH SOLID ADBLUE

(71) Applicant: HEFEI UNIVERSITY OF TECHNOLOGY, Hefei (CN)

(72) Inventors: Hong Bao, Hefei (CN); Jing Yang, Hefei (CN); Tianci Liu, Hefei (CN); Hongzhen Li, Hefei (CN); Jinxuan Tao, Hefei (CN); Junguo zhang, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 17/676,306

(22) Filed: Feb. 21, 2022

(30) Foreign Application Priority Data

Feb. 24, 2021 (CN) .......................... 202110209538.3

(51) Int. Cl.
*B60K 13/04* (2006.01)
*B60Q 9/00* (2006.01)
*H05B 1/02* (2006.01)
*B01F 35/93* (2022.01)
*B01F 27/921* (2022.01)
*B01F 35/90* (2022.01)
*B01D 53/94* (2006.01)

(52) U.S. Cl.
CPC ............ *B60K 13/04* (2013.01); *B01F 27/921* (2022.01); *B01F 35/93* (2022.01); *B60Q 9/00* (2013.01); *H05B 1/0236* (2013.01); *B01D 53/9418* (2013.01); *B01F 2035/99* (2022.01)

(58) Field of Classification Search
CPC ........ B60K 13/04; B01F 35/93; B01F 27/921; B01F 2035/99; B60Q 9/00; H05B 1/0236; B01D 53/9418
See application file for complete search history.

(56) References Cited

U.S. PATENT DOCUMENTS

| 2008/0256937 | A1* | 10/2008 | Suzuki | F01N 3/106 392/455 |
| 2009/0065508 | A1* | 3/2009 | Haeberer | F01N 3/2066 264/572 |
| 2009/0100824 | A1* | 4/2009 | Starck | F01N 13/009 219/202 |

(Continued)

FOREIGN PATENT DOCUMENTS

CN        103089382 A        5/2013

OTHER PUBLICATIONS

CNIPA, Notification of Grant of Invention Patent for CN App. No. 202110209538.3, dated Jan. 6, 2022.

(Continued)

*Primary Examiner* — Dana Ross
*Assistant Examiner* — Joe E Mills, Jr.
(74) *Attorney, Agent, or Firm* — Hemisphere Law, PLLC; Zhigang Ma

(57) ABSTRACT

A device for supplying ammonia with solid adblue includes a urea tank, a gasholder, a heating apparatus, a mixing mechanism, a one-way valve, a first temperature sensor, a second temperature sensor, a first baroceptor, a controller. The mixing mechanism includes a first pipe, second pipe a third pipe, and media. The device is easy to has the same temperature everywhere, and then the heat distribution of the urea tank can be evenly. Thus the effectiveness about the heating apparatus is elevated.

8 Claims, 7 Drawing Sheets

(56) References Cited

U.S. PATENT DOCUMENTS

2014/0000246 A1\* 1/2014 Hosoya ................ F01N 13/009
                                                                         60/286

OTHER PUBLICATIONS

CNIPA, Notice of first review opinion for CN App. No. 202110209538.3, dated Nov. 25, 2021.
CNIPA, Search Report for CN App. No. 2021102095383, dated Nov. 15, 2021.

\* cited by examiner

DEVICE FOR SUPPLYING AMMONIA WITH SOLID ADBLUE

FIELD OF THE INVENTION

The present invention relates to technical field of environmental protection equipment, and more particularly to a device for supplying ammonia with solid adblue.

BACKGROUND OF THE INVENTION

Cleanness and environmental protection are important goals and also a development direction for automobile industry. Automobile exhaust is the biggest pollution source in the process of vehicle operation. The automobile exhaust contains a large number of toxic and harmful nitrogen oxides, hydrocarbon compounds and so on. If the pollutants are directly discharged into the air, they will cause serious pollution to the atmosphere. Therefore, countries all over the world require vehicles to purify exhaust gas.

Selective Catalytic Reduction (SCR) is a nitrogen oxide pollution treatment processes for exhaust gas from diesel-fuelled vehicles. SCR is that, in the presence of catalyst, spraying the exhaust pipe with reducing agent ammonia or liquid adblue, and reducing nitrogen oxides from exhaust fumes to $N_2$ and $H_2O$. In the traditional SCR system, exhaust gas from the turbine gets into a pipe with a device for metering and injecting urea. The liquid adblue is sprayed into the pipe, and generates $NH_3$ after hydrolysis and pyrolysis at high temperature. The liquid adblue is reduced by $NH_3$ with SCR and $N_2$ is outputted. The excess $NH_3$ is also oxidized to $N_2$. Therefore, the exhaust gas is prevented from leaking.

However, there are many problems for the liquid adblue. One fatal problem of the liquid adblue is that it cannot be stored under a low temperature. As a lot of liquid in the liquid adblue, it has more water vapor in $NH_3$ generated under a colder environment, and the water vapor and $NH_3$ pass by a running piping would be congealed on the surface of the running piping, and would affect the emission and purification of vehicle exhaust gas.

So, it is important to provide a device to clean up the exhaust, which has no defects with supplying the liquid adblue and can reduce effect on vehicle infrastructure.

SUMMARY OF THE INVENTION

Therefore, the object of the present invention is to provide a device for supplying ammonia with solid adblue, which solid adblue is used for supplying ammonia and can solve many problems associated with liquid adblue, such as easy to getting cold and too much water vapour content.

The present invention provides a device for supplying ammonia with solid adblue, which is installed on a gas tank of a vehicle and is integrated with the gas tank, includes:

a urea tank, used to store the solid adblue sublimed by heating; an insulated shell is used for the urea tank, a first through-hole and an inlet defined in the shell of the urea tank; the inlet used for putting the solid adblue in the urea tank; a gas vent defined on the roof of the urea tank;

a gasholder, interconnected with the gas vent by a tube, used for storing gas generated by the solid adblue with a sublimed way; a thermal insulation interlayer arranged in the shell of the gasholder; the gasholder interconnected with an ejector which is used for supplying the solid adblue to clean vehicle exhaust;

a heating apparatus, including a first pipe for heating exhaust gas of the vehicle, a second pipe for heating the solid adblue electrically, a third pipe for controlling the temperature of the solid adblue, and media for controlling the temperature of the solid adblue; a chamber defined in the urea tank; the third pipe being a sealed pipe with a manageable temperature, and constituted by an annulus and a plurality of vertical tubes; one end of each vertical tube fixed on the annulus, and interconnected with the annulus; the other end of each vertical tube extended vertically to the annulus, and the annulus set horizontally; the plurality of vertical tubes on the same side of the annulus and arranged evenly around the annulus; a certain gap between each two neighboring vertical tubes; the media filled in the chamber of the third pipe; the media being an azeotrope which is consisted by at least one material, and having a boiling point between 130-150° C.; the first pipe used to heat exhaust gas and to transmit the vehicle exhaust; the first pipe interconnected with the urea tank by the first through-hole; one end of the first pipe extended into the urea tank and being inside of the third pipe; the first pipe interconnected with a second pipeline of the vehicle by the three-way valve, and the second pipeline used to discharge the vehicle exhaust; the three-way valve used to control the first pipe to let out the vehicle exhaust or used to let out the vehicle exhaust directly; the input of the three-way valve interconnected with the entry end of the second pipeline; the two outputs of the three-way valve interconnected with the exit end of the second pipeline and the entry end of the first pipe respectively; the exit end of the first pipe extended to the exit end of the second pipeline; the second pipe heated electrically by heating elements and used to heat the solid adblue; both of the first pipe and the second pipe extended inside of the urea tank by the first through-hole and coated by the third pipe;

a mixing mechanism, used to stir the solid adblue and arranged on the roof of the urea tank; the mixing mechanism comprising a packing auger and a drive motor; the drive motor arranged on the roof of the urea tank; one end of the packing auger installed on the drive motor and rotated by the drive motor; the other end of the packing auger extended underlay to across the annulus, and surrounded by the plurality of vertical tubes; the solid adblue elevated by the packing auger while rotated by the drive motor;

a one-way valve, arranged on the gas vent of the urea tank, and used to control the gas only to be transmitted from the urea tank to the gasholder;

a first temperature sensor, set inside of the third pipe, and used to get a temperature T1 of the media inside of the third pipe;

a second temperature sensor, arranged inside of the urea tank, and used to get a temperature T2 of the environment inside of the urea tank;

a first baroceptor, set inside of the gasholder and used to get a pressure P1 of the gasholder; and a controller, connected to the second pipe, the three-way valve, the drive motor, the first temperature sensor, the second temperature sensor, and the first baroceptor; the controller having a controlling method which including:

step S1: receiving the pressure P1 of the gasholder in real time, and deciding whether the solid adblue to be heated according to the pressure P1:

(1) when P1≥p1, controlling the solid adblue out of heating, and returning to the step S1; and (2) when P1<p1, going to the next step S2; and wherein the pressure p1 is an empirical value and is also a minimum value that there is enough solid adblue for a vehicle running a certain time; when the pressure P1 is lower the pressure p1, the gasholder is lack of solid adblue;

step S2: turned the first pipe on by the three-way valve, and turned the drive motor on;

step S3: receiving the temperature T1 of the media inside of the third pipe and the temperature T2 of the environment inside of the third pipe, then outputting decisions as follows:

step S31; with a given cycle period for heating, judging the temperature T1 and T2 whether are within a temperature range (t1, t2), t1≥130° C., t2≤150° C., and deciding as follows:
(1) when the temperature T1 within the temperature range (t1, t2), turned the first pipe on;
(2) when the temperature T2 without the temperature range (t1, t2), turned both the first pipe and the second pipe on;

step S32; when one of the temperatures T1 and T2 more than the temperature-max t2, t2≤150° C., turned the first pipe off by the three-way valve, and/or turned the second pipe off; and step S33; when the temperature T1 lower than the temperature-min t1, t1≥130° C., turning the first pipe on by the three-way valve again, and returning to the step S31, otherwise going to the step S4; and Step S4: receiving the pressure P1 of the gasholder 2 in real time, and deciding whether the pressure P1 being equal to a pressure p2:
(1) when P1≥p2, turned the first pipe off by the three-way valve, and turned the drive motor off; and
(2) when P1 <p2, returning to the step S1.

In the device of the present invention.

In the device of the present invention, the second pipe is shaped corresponding to the third pipe, the second pipe also comprises two parts according to the annulus and the plurality of vertical tubes; one part corresponding to the annulus is inside of the annulus, and the other part corresponding to the plurality of vertical tubes is insert into the plurality of vertical tubes and is extended out of the plurality of vertical tubes; leakproof structures can be arranged on the connection between the third pipe and the first pipe; the second pipe is parallel to the first pipe.

In the device of the present invention, an insulated shell is used as the outside wall of the urea tank, and foam materials as insulation interlayer with low thermal conductance are arranged inside of the insulated shell; a double layer structure with a vacuum interlayer is arranged in on the outside wall of the gasholder; a thermal insulation layer is covered over the outside of the gasholder, and the insulating material is also be foam material.

In the device of the present invention, further includes:
a second baroceptor, inside of the urea tank and used to get a pressure P2 of the urea tank; and
a vacuum pump, the entrance of the vacuum pump interconnect with the urea tank, and the exit of the vacuum pump interconnect with the gasholder;
the vacuum pump is used to transmit the gas which is formed by the sublimation of the solid adblue to the gasholder; both the second baroceptor and the vacuum pump are connected electrically to the controller and are controlled under the controller.

In the device of the present invention, further includes:
a displacement sensor, used to test a remain solid adblue inside of the urea tank, and to get a vertical distance d between the top of the urea tank and the vertex of the solid adblue; the displacement sensor arranged on the roof of the inside-wall of the urea tank, and connected with the controller electrically; and
a siren, connected with the controller electrically;
the controller is used to receive the vertical distance d from the displacement sensor, and outputting decisions according to the vertical distance d; the controller is further used to control the siren whether to alarm according to the vertical distance d.

In the device of the present invention, the controlling method of the controller to the siren includes:
(1) receiving the vertical distance d from the displacement sensor; and
(2) comparing with a height h0 which is an empirical value;
when h≥h0, keeping the siren to turn off; and
when h<h0, control the siren to turn on, and give a reminder of lacking of the solid adblue.

In the device of the present invention, the vertical distance d from the displacement sensor is showed in a display instrument of the vehicle; the reminder of lacking of the solid adblue is outputted by a buzzer or a display of the vehicle.

In the device of the present invention, a first pipeline is arranged in a inlet of the urea tank and extends up slantwise until the entrance of the vehicle; the top opening of the first pipeline is provided with a sealed cover body; both the inside wall of the urea tank and the gasholder, the surface of the packing auger, and the outside wall of the third pipe are coated by PTFE films.

Compared with the traditional art, the device of the present invention has following advantages.

The solid adblue is used by the device to the material for the SCR system. Therefore, it can overcome the disadvantage that traditional urea solution is easy to freeze at low temperature and reduce the moisture content in urea, so as to avoid the influence of water vapor on the REDOX effect of SCR system and reduce the risk of pipeline blockage.

Using the waste heat of the vehicle exhaust as the main heat source of urea evaporation can effectively reduce the energy consumption of vehicles. It has outstanding energy saving and environmental protection benefits, and has no influence on the power and driving performance of vehicles. At the same time, the device can be integrated with the traditional vehicle and it is no influence on existing fuel tank structure. The impact on the vehicle structure is relatively small, suitable for the existing vehicle retrofitting, high practicability, strong versatility.

Appropriate layout of stirring mechanism and heating mechanism, make urea heating sublimation process of each part of uniform heat, avoid local overheating caused by urea pyrolysis. At the same time, the heating mechanism also is designed a special temperature control tube, and is used to control the temperature of the heating pipe. It is further improves the urea tank heating process of temperature control effect.

The device includes the controller and many sensors. The sensor can detect the parameters of air pressure, temperature and urea allowance in each part of the device. The controller can automatically control the running state of the device accordingly, so that the device has a high degree of automation performance, reduce the workload of the operator.

BRIEF DESCRIPTION OF THE DRAWINGS

The above objects and advantages of the present invention will become more readily apparent to those ordinarily skilled in the art after reviewing the following detailed description and accompanying drawings, in which.

Figure 1:
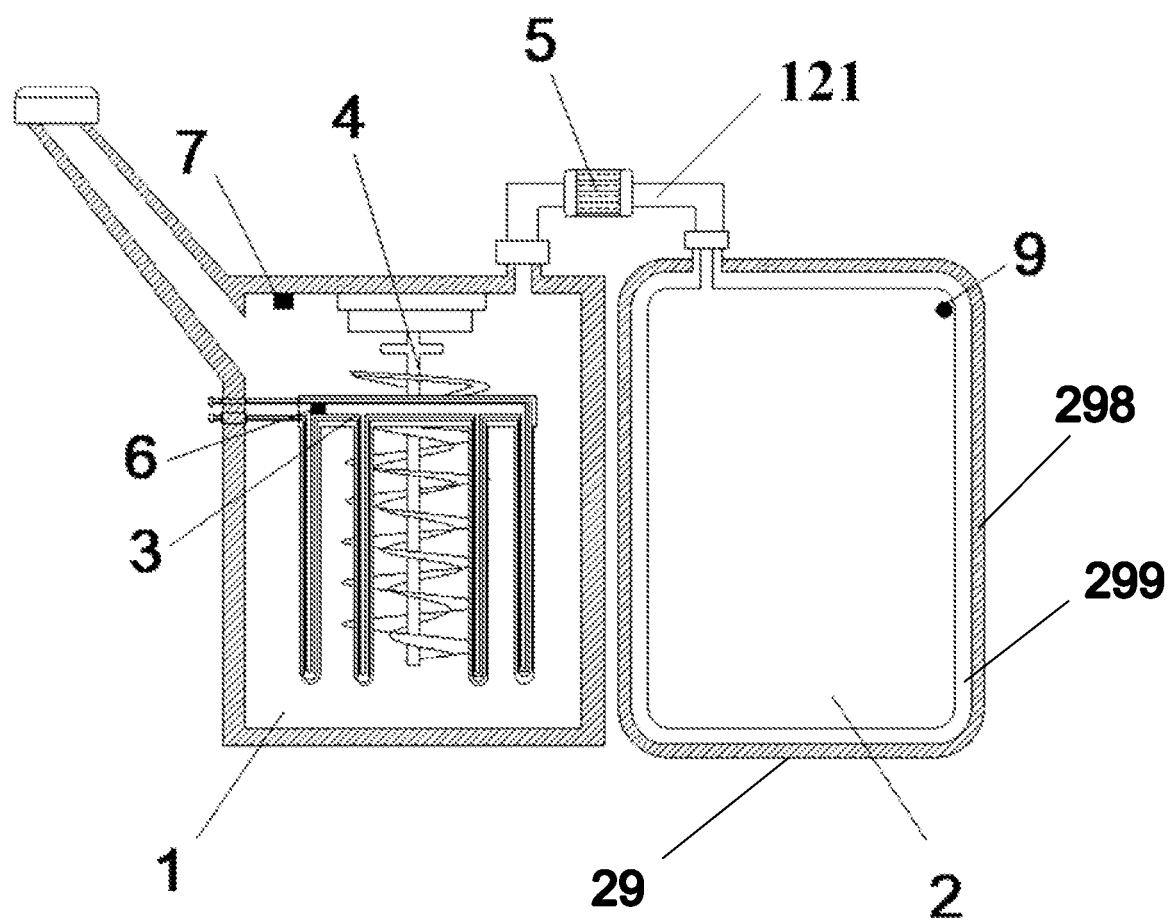
FIG. 1 is a schematic diagram of a device for supplying ammonia with solid adblue, according to the first embodiment.

Drawings labels in the FIGS. are as follows: urea tank 1; gasholder 2; heating apparatus 3; mixing mechanism 4; one-way valve 5; first temperature sensor 6; second temperature sensor 7; second baroceptor 8; first baroceptor 9; vacuum pump 10; displacement sensor 11; gas vent 12; first through-hole 13; first pipeline 14; three-way valve 15; second pipeline 16; siren 17; drive motor 41; packing auger 42; first pipe 61; second pipe 62; third pipe 63; controller 100; annulus 631; plurality of vertical tubes 632; tube 121; inlet 131; annulus 631; vertical tubes 632; insulated shell 197; insulation interlayer 198; outer layers 199; shell 29 of gasholder 2; thermal insulation layer 298; vacuum interlayer 299.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First embodiment

Referring to FIG. 1, a device for supplying ammonia with solid adblue is showed in the present embodiment. The device is installed on a gas tank of a vehicle (unshown), and is integrated with the gas tank. The device includes a urea tank 1, a gasholder 2, a heating apparatus 3, a mixing mechanism 4, a one-way valve 5, a first temperature sensor 6, a second temperature sensor 7, a first baroceptor 9, and a controller 100.

Figure 2:
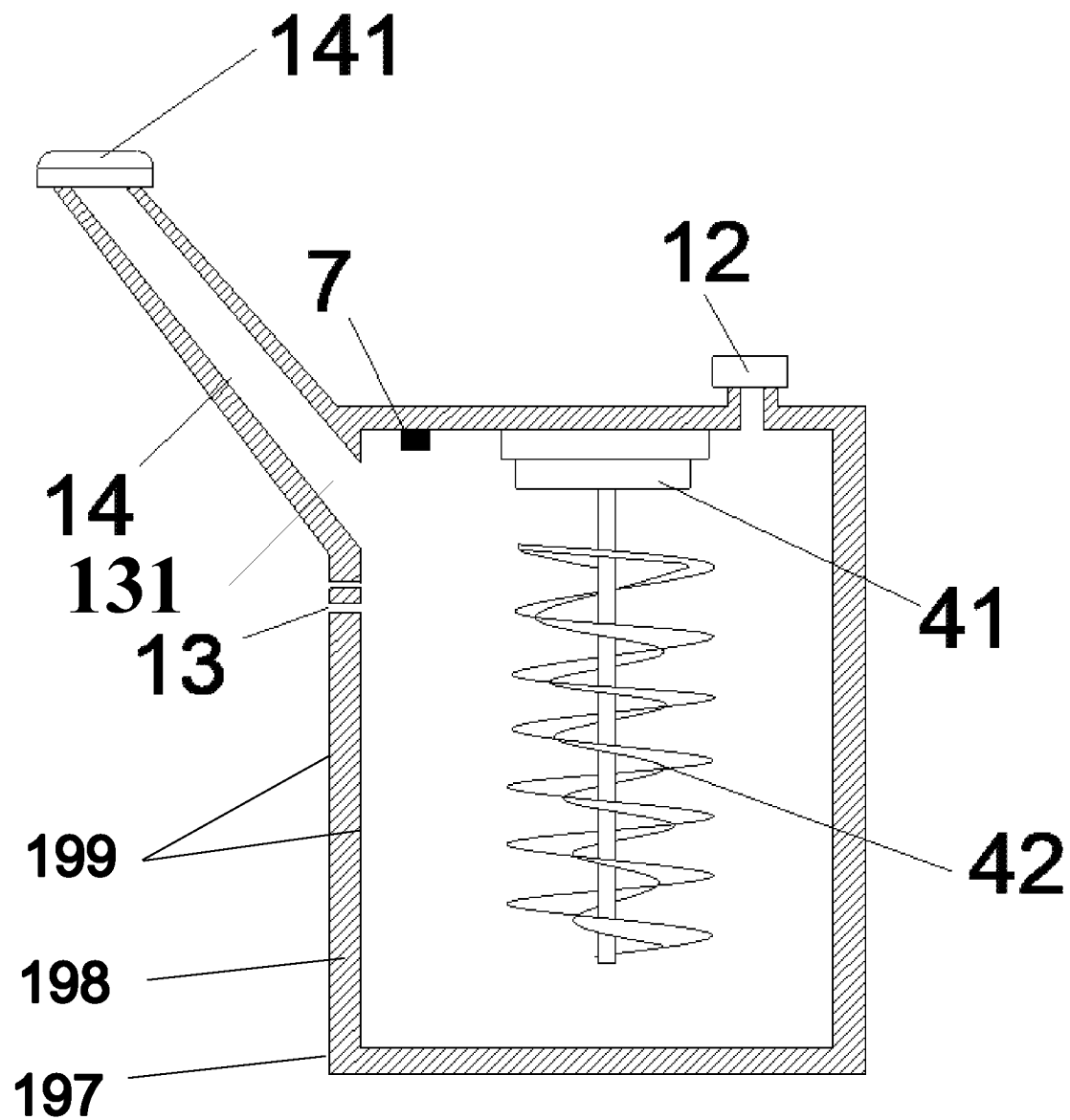
FIG. 2 is a schematic diagram of a urea tank, according to the first embodiment.

Referring to FIG. 2, the urea tank 1 is used for store the solid adblue. The solid adblue would be sublimed by heating and is as material to clean vehicle exhaust. The urea tank 1 is sealed. An insulation interlayer 198, sandwiched by two outer layers 199, is equipped in the shell 197 of the urea tank 1. The shell 197 of the urea tank 1 is provided with a first through-hole 13 and an inlet 131. The heating apparatus 3 runs through the first through-hole 13. The inlet 131 is used for putting the solid adblue in the urea tank 1. The roof of the urea tank 1 is provided with a gas vent 12. In the in other embodiments, a filter can be arranged on the gas vent 12 according to the need.

The gasholder 2 is interconnected with the gas vent 12 by a tube 121. The gasholder 2 is used for storing gas generated by the solid adblue with a sublimed way. A thermal insulation interlayer 298, is equipped in the shell 29 of the gasholder 2. The gasholder 2 is interconnected with an ejector which is used for supplying the sublimed adblue to clean vehicle exhaust.

Figure 3:
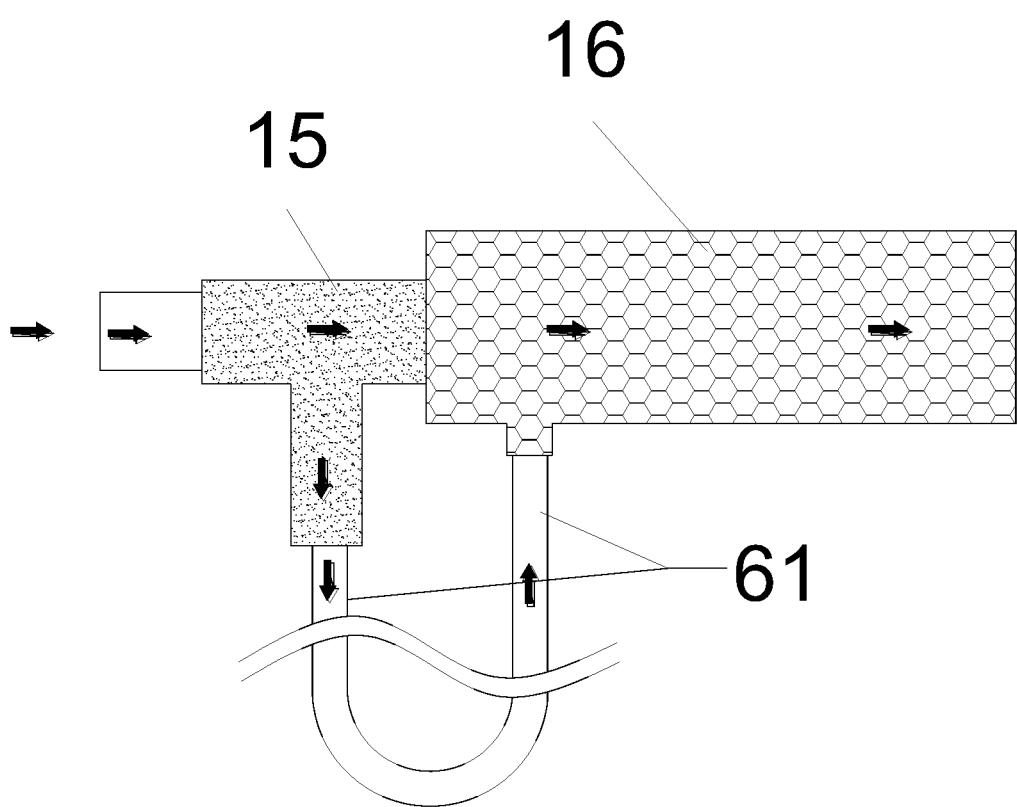
FIG. 3 is a connection diagram for a three-way value, an exhaust gas heating unit and an exhaust air duct, according to the first embodiment.

The heating apparatus 3 includes a first pipe 61 for passing exhaust gas of the vehicle, a third pipe 63 for controlling the temperature of the solid adblue, and media for controlling the temperature of the solid adblue. A chamber is arranged in the urea tank 1 and used to store media which can be controlled by temperature. The third pipe 63 is a sealed pipe having a manageable temperature. The third pipe 63 is constituted by an annulus 631 and a plurality of vertical tubes 632. One end of each vertical tube 632 is fixed on the annulus 631, and is interconnected with the annulus 631. The other end of each vertical tube 632 extends vertically away from the annulus 631, and the annulus 631 is set horizontally. The plurality of vertical tubes 632 is on the same side of the annulus 631 and is arranged evenly around the annulus 631. There is a certain gap between each two neighboring vertical tubes 632. The media is filled in the chamber of the third pipe 63. The media is an azeotrope which is consisted by at least one material, and has a boiling point between 130-150° C. The first pipe 61 is used to utilize exhaust gas and to transmit the vehicle exhaust, and it is good for using waste heat of the vehicle exhaust to heat the solid adblue. The first pipe 61 is interconnected with the urea tank 1 by the first through-hole 13. One end of the first pipe 61 is extended into the urea tank 1 and is inside of the third pipe 63. Referring to FIG. 3, the first pipe 61 is interconnected with a second pipeline 16 of the vehicle by the three-way valve 15, and the second pipeline 16 is used to discharge the vehicle exhaust. The three-way valve 15 is used to control the first pipe 61 to let out the vehicle exhaust or used to let out the vehicle exhaust directly. The input of the three-way valve 15 is interconnected with the entry end of the second pipeline 16. The two outputs of the three-way valve 15 are interconnected with the exit end of the second pipeline 16 and the entry end of the first pipe 61 respectively. The exit end of the first pipe 61 is extended to the exit end of the second pipeline 16.

Referring to FIG. 2 again, the mixing mechanism 4 is used to stir the solid adblue. The mixing mechanism 4 is installed on the roof of the urea tank 1. The mixing mechanism 4 includes a packing auger 42 and a drive motor 41. The drive motor 41 is installed on the roof of the urea tank 1. One end of the packing auger 42 is installed on the drive motor 41 and rotated by the drive motor 41. The other end of the packing auger 42 is extended underlay to across the annulus 631, and is surround by the plurality of vertical tubes 632. When the packing auger 42 is rotated by the drive motor 41, the packing auger 42 elevates the solid adblue.

The one-way valve 5 is arranged on the gas vent 12 of the urea tank 1. The one-way valve 5 is used to control the gas only transmitting from the urea tank 1 to the gasholder 2.

The first temperature sensor 6 is set inside of the third pipe 63, and is used to get a temperature T1 of the media which is inside of the third pipe 63. The temperature T1 is used to decide whether the third pipe 63 continues to heat. When temperature T1 is more than a temperature-max, the third pipe 63 would stop heating, then solid adblue in the urea tank 1 can be avoid to pyrolysis. When temperature T1 is lower than a temperature-min, the third pipe 63 would keep heating, then solid adblue in the urea tank 1 can be encouraged to sublime.

The second temperature sensor 7 is set inside of the urea tank 1, and is used to get a temperature T2 of the environment inside of the urea tank 1. The temperature T2 is the testing index of the urea tank 1, because the temperature of the device must be in the 130-150° C. range.

The first baroceptor 9 is set inside of the gasholder 2, and is used to get a pressure P1 of the gasholder 2. The pressure P1 is used to decide whether the solid adblue should be sublimed by heating. When the pressure P1 is lower than a pressure-min, the solid adblue should be heated to sublime more gas. When the pressure P1 is more than a pressure-max, the solid adblue should be stopped heating, Because the high pressure is easy to destroy the urea tank 1 and the gasholder 2, then it is easy to happen gas leakage.

The controller 100 connects the three-way valve 15, the first pipe 61, the drive motor 41, the first temperature sensor 6, the second temperature sensor 7, and first baroceptor 9, respectively. The controller 100 is used to receive signals from the first temperature sensor 6, the second temperature sensor 7, and first baroceptor 9, and is also used to control the three-way valve 15, the first pipe 61, the drive motor 41 according to the signals.

In the present embodiment, the working process of the device for supplying ammonia with solid adblue is introduced as follows.

In the operational process of a vertical, the solid adblue prepared in the urea tank 1 is sublimed by heating, and is turned to be gaseous. The gaseous adblue enters into the gasholder 2 by the one-way valve 5 and is to be a spare of a SCR system.

In the present embodiment, in order to expedite subliming to the solid adblue in the urea tank 1, the heating apparatus 3 is arranged in the urea tank 1. The heat source of the first pipe 61 comes from the waste heat of the vehicle exhaust, and offer excellent performance about energy saving and environmental protection.

As the temperature of the vehicle exhaust maybe between 200-300° C., The solid adblue would be decomposed to use for the SCR system. Therefore, the heating apparatus 3 not only includes the first pipe 61, but also includes the third pipe 63. The part of the first pipe 61 inside of the urea tank 1, is coated by the third pipe 63. The third pipe 63 is filled with the media. The media is an azeotrope which has a boiling point between 130-150° C. The media would warm up quickly after heating, and when the temperature of the media reaches the boiling point, because some of the heat is used to vaporize some of the components of the azeotrope, the rate of temperature rise of the azeotrope slows down significantly. Therefore, when the media is heated by the first pipe 61, the temperature of the media rises 150° C. slowly to keep temperature between 130-150° C. Then the process for rising the temperature of the media can be under control, and it is not easy to appear pyrolytic reaction but to keep subliming.

In order to heat the solid adblue of the urea tank 1 evenly during the heating process, in the present embodiment, the mixing mechanism 4 is arranged in urea tank 1. When the mixing mechanism 4 is active, the packing auger 42 is rotated by the drive motor 41 to turn up the solid adblue which is at the bottom of the urea tank. It is ensured that solid adblue is heated evenly, and the occurrence of sublimation phenomenon is easy to appear. In order to avoid disturbing between the heating apparatus 3 and the mixing mechanism 4, the connection of the heating apparatus 3 and the mixing mechanism 4 is designed cleverly. Then the heating and stirring processes can be completed simultaneously.

In order to correspond to the third pipe 63, the first pipe 61 also includes two parts according to the annulus 631 and the plurality of vertical tubes 632. One part corresponds to the annulus 631 is inside of the annulus 631, and the other part correspond to the plurality of vertical tubes 632 is insert into the plurality of vertical tubes 632 and is extended out of the plurality of vertical tubes 632. Leakproof structures can be arranged on the connection between the third pipe 63 and the first pipe 61.

Because of the design of the first pipe 61, the third pipe 63 is easy to has the same temperature everywhere. Then the heat distribution of the urea tank 1 can be evenly. And the effectiveness about the heating apparatus 3 is elevated.

In the present embodiment, insulation interlayer 198 is arranged in the insulated shell 197 of the urea tank, and foam materials with low thermal conductance are arranged inside of the shell 197. The shell of the gasholder 2 has a double layer structure with a vacuum interlayer 299. A thermal insulation layer 298 is covered over the outside of the gasholder 2, and the insulating material is also be foam material.

It is need to keep warm on the urea tank 1 and the gasholder 2 when they are using. In order to protect the heat from losing, an insulation layer is set inside of the urea tank 1. It is higher to the gasholder 2 has higher requirements for insulation. In addition to the insulation layer, the present embodiment also uses a double-layer structure, including the thermal insulation layer 298, and the vacuum layer 299, of the gasholder 2.

The first pipeline 14 is arranged in the inlet 131. The first pipeline 14 extends up slantwise until the entrance of the vehicle. The top opening of the first pipeline 14 is provided with a sealed cover body that can be opened and closed.

In the present embodiment, the inlet 131 of the urea tank 1 is respectively to the entrance of the vehicle. Then it is easy for operator to add the solid adblue into the urea tank 1, and it is almost no influence on the vehicle.

In addition, the inside wall of the urea tank 1, the inside wall of the gasholder 2, the surface of the packing auger 42, and the outside wall of the third pipe 63 can be coated by a poly tetra fluoroethylene (PTFE) film.

As the solid adblue is corrosive, in order to extend the useful life of the urea tank 1, the gasholder 2, the packing auger 42, and the third pipe 63, PTFE films can be coated respectively.

In the present embodiment, the controller 100 is used to control the device to supplying ammonia with solid adblue, and the control process of the controller 100 is introduced as follows.

Step S1: receiving the pressure P1 of the gasholder 2 in real time, and deciding whether the solid adblue being to heat according to the pressure P1.

(1) when P1≥p1, control the solid adblue out of heating, and return to receive the pressure P1.

(2) when P1<p1, go to the next step S2.

The pressure p1 is an empirical value and is also a minimum value that there is enough solid adblue for a vehicle running a certain time. When the pressure P1 is lower the pressure p1, the gasholder 2 is lack of solid adblue.

Step S2: controlling the first pipe 61 to turn on by the three-way valve 15, and controlling the drive motor 41 to turn on. Then the first pipe 61 transmits the solid adblue.

Step S3: receiving the temperature T1 of the media inside of the third pipe 63 and the temperature T2 of the environment inside of the third pipe 63, then outputting decisions according to the temperature T1 and T2.

(1) When one of the temperatures T1 and T2 more than a temperature-max t2, t2≤150° C., control the first pipe 61 to turn off by the three-way valve 15.

(2) When the temperature T1 lower than a temperature-min t1, t1≥130° C., control the first pipe 61 to turn on by the three-way valve 15 again.

Step S4: receiving the pressure P1 of the gasholder 2 in real time, and deciding whether the pressure P1 being to a pressure p2.

(1) When P1≥p2, control the first pipe 61 to turn off by the three-way valve 15, and to turn off the drive motor 41.

(2) When P1<p2, control to return the step S1.

Second embodiment

There is much difference between the first embodiment and the second embodiment.

Figure 4:
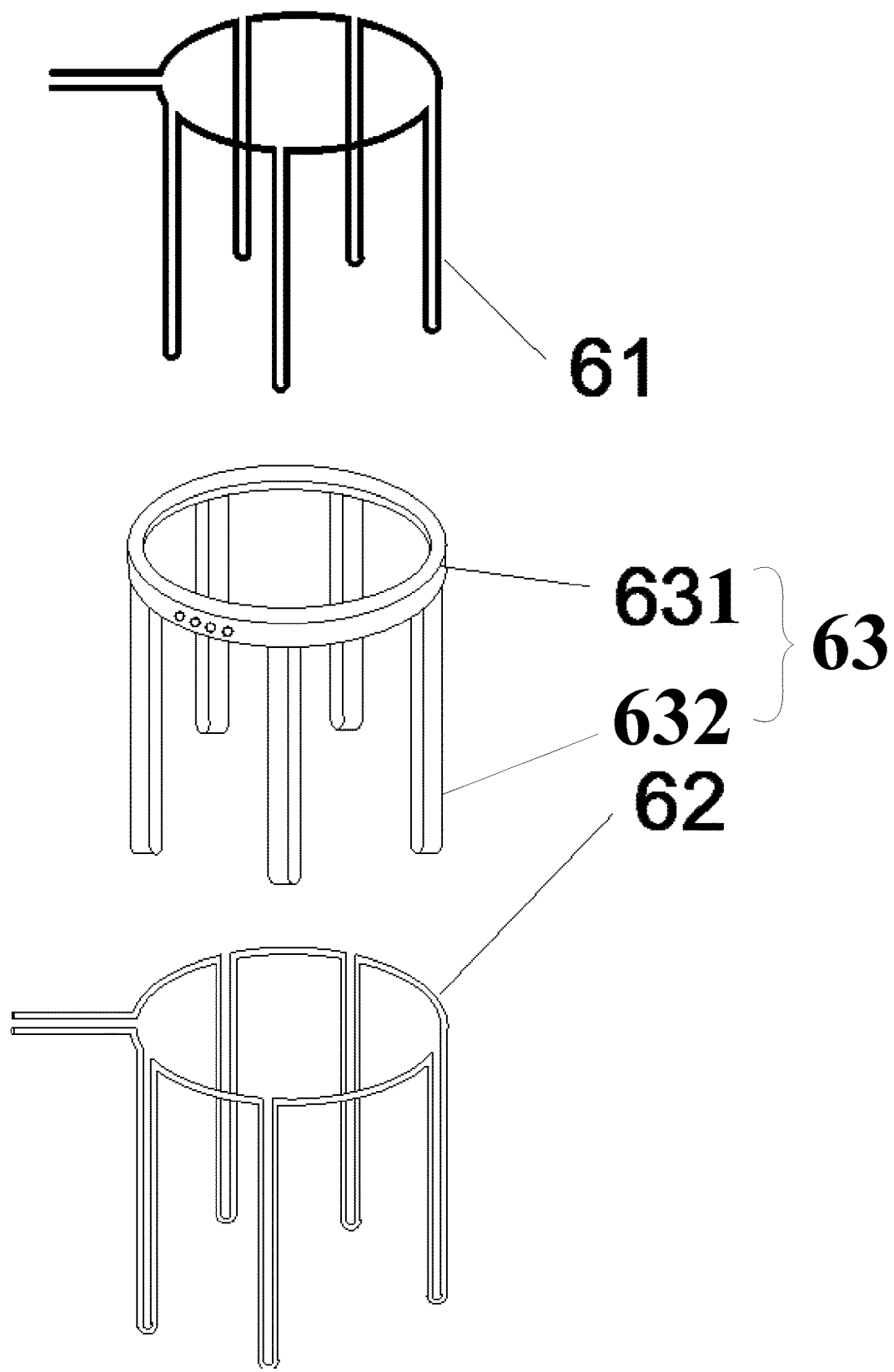
FIG. 4 is an exploded diagram of a heating apparatus, according to the second embodiment.
Figure 5:
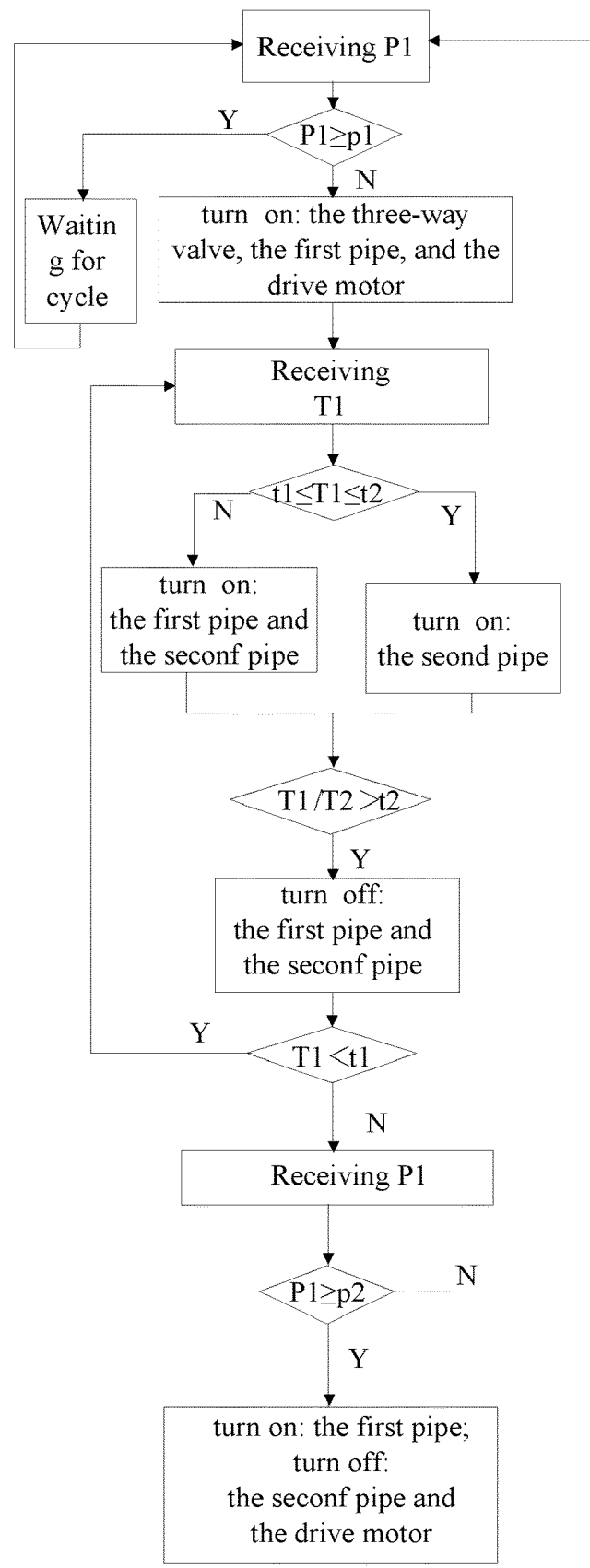
FIG. 5 is a sequence diagram of a device for supplying ammonia with solid adblue under the control of a controller, according to the second embodiment.

Referring to FIG. 4, in the second embodiment, the heating apparatus 3 further includes the second pipe 62. The second pipe 62 can be heated electrically by heating elements. Therefore, the second pipe 62 is used to heat the solid adblue. Both of the first pipe 61 and the second pipe 62 are extended inside of the urea tank 1 by the first through-hole 13. The parts of the first pipe 61 and the second pipe 62 are both inside of the urea tank 1, and are coated by the third pipe 63. The second pipe 62 is connected to the controller 100 electrically, and is controlled by the controller 100.

In order to sublime the solid adblue inside of the urea tank 1 further, the second embodiment adds the second pipe 62. The heat source of the first pipe 61 comes from the waste heat of the vehicle exhaust, and offer excellent performance about energy saving and environmental protection. At the same time, when the vehicle is just starting or idling, the emission of the vehicle exhaust may not need the required heating power or the temperature of the vehicle exhaust may not reach the heating temperature. Then the waste heat of the vehicle exhaust is lack. At this time, the second pipe 62 can be turned on to supply heat, and the first pipe 61 is supplemented.

In order to correspond to the third pipe 63, the second pipe 62 also includes two parts according to the annulus 631 and the plurality of vertical tubes 632. One part corresponds to the annulus 631 is inside of the annulus 631, and the other part corresponds to the plurality of vertical tubes 632 is insert into the plurality of vertical tubes 632 and is extended out of the plurality of vertical tubes 632. Leakproof structures can be arranged on the connection between the third pipe 63 and the first pipe 61. The second pipe 62 is parallel to the first pipe 61.

Because of the design of the second pipe 62, the third pipe 63 is easy to has the same temperature everywhere. Then the heat distribution of the urea tank 1 can be evenly. And it is elevated to the effectiveness of the heating apparatus 3.

In the second embodiment, the controlling method of the controller 100 which is used to control the device is introduced as follows.

Step S1: receiving the pressure P1 of the gasholder 2 in real time, and deciding whether the solid adblue to be heated according to the pressure P1.

(1) when P1≥p1, control the solid adblue out of heating, and return to receive the pressure P1.

(2) when P1<p1, go to the next step S2.

The pressure p1 is an empirical value and is also a minimum value that there is enough solid adblue for a vehicle running a certain time. When the pressure P1 is lower the pressure p1, the gasholder 2 is lack of solid adblue.

Step S2: controlling the first pipe 61 to turn on by the three-way valve 15, and controlling the drive motor 41 to turn on. Then the first pipe 61 transmits the solid adblue.

Step S3: receiving the temperature T1 of the media inside of the third pipe 63 and the temperature T2 of the environment inside of the third pipe 63, then outputting decisions as follows.

Step S31; with a given cycle period for heating, judging the temperature T1 and T2 whether are within a temperature range (t1, t2), t1>130° C., t2≥150° C., and deciding as follows.

(1) When the temperature T1 is within the temperature range (t1, t2), control the first pipe 61 to turn on.

(2) When the temperature T2 is without the temperature range (t1, t2), control both the first pipe 61 and the second pipe 62 to turn on.

Step S32; when one of the temperatures T1 and T2 is more than the temperature-max t2, t2≥150° C., control the first pipe 61 to turn off by the three-way valve 15, and/or to turn off the second pipe 62.

Step S33; when the temperature T1 lower than the temperature-min t1, t1≥130° C., control the first pipe 61 to turn on by the three-way valve 15 again, and return to the step S31, otherwise go to the step S4.

Step S4: receiving the pressure P1 of the gasholder 2 in real time, and deciding whether the pressure P1 being to a pressure p2.

(1) When P1≥p2, control the first pipe 61 to turn off by the three-way valve 15, and to turn off the drive motor 41.

(2) When P1<p2, control to return the step S1.

Third embodiment

There is much difference between the third embodiment and the second embodiment.

Figure 6:
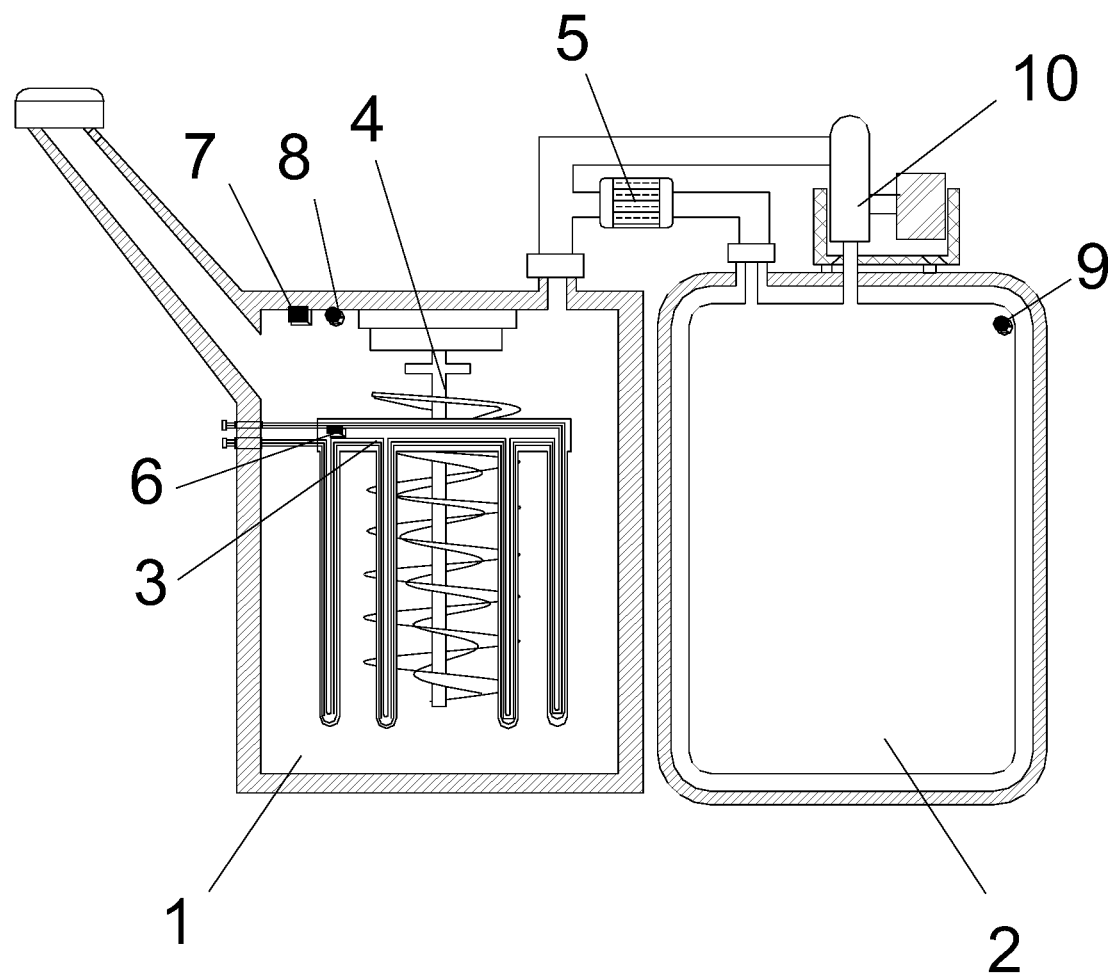
FIG. 6 is a schematic diagram of a device for supplying ammonia with solid adblue, according to the third embodiment.

Referring to FIG. 6, in the third embodiment, the device further includes a second baroceptor 8 and a vacuum pump 10. The second baroceptor 8 is inside of the urea tank 1 and is used to get a pressure P2 of the urea tank 1. The entrance of the vacuum pump 10 is interconnected with the urea tank 1, and the exit of the vacuum pump 10 is interconnected with the gasholder 2. The vacuum pump 10 is used to transmit the gas which is formed by the sublimation of the solid adblue to the gasholder 2. Both the second baroceptor 8 and the vacuum pump 10 are connected electrically to the controller 100, and are controlled under the controller 100.

In the third embodiment, the controlling method of the controller 100 which is used to control the vacuum pump 10 is introduced as follow.

(1) Receiving a pressure P1 from the first baroceptor 9 and a pressure P2 from the second baroceptor 9.

(2) calculating a pressure difference $\Delta P$ between the pressure P1 and the pressure P2: $\Delta P=P1-P2$, then outputting decisions as follows according to the pressure difference $\Delta P$.

When $\Delta P \geq p0$, control the vacuum pump 10 to turn on.

When $\Delta P > p0$, control the vacuum pump 10 to turn off.

The pressure p0 is an empirical value and is also a minimum value to keep gas transmitting from the urea tank 1 to the gasholder 2.

The vacuum pump 10 is used to help gas easy to transmit from the urea tank 1 to the gasholder 2. With the vacuum pump 10, it is possible that gas is transmitted from the urea tank 1 to the gasholder 2 even though the pressure p0 is low.

With the vacuum pump 10, it is faster for the rate of subliming the solid adblue, and the pressure of the gasholder 2 is increased. Then the pressure of the gasholder 2 is higher than the pressure of the urea tank 1, thus, more volume of sublimed gas can be stored in the gasholder 2.

Fourth embodiment

There is much difference between the third embodiment and the fourth embodiment.

Figure 7:
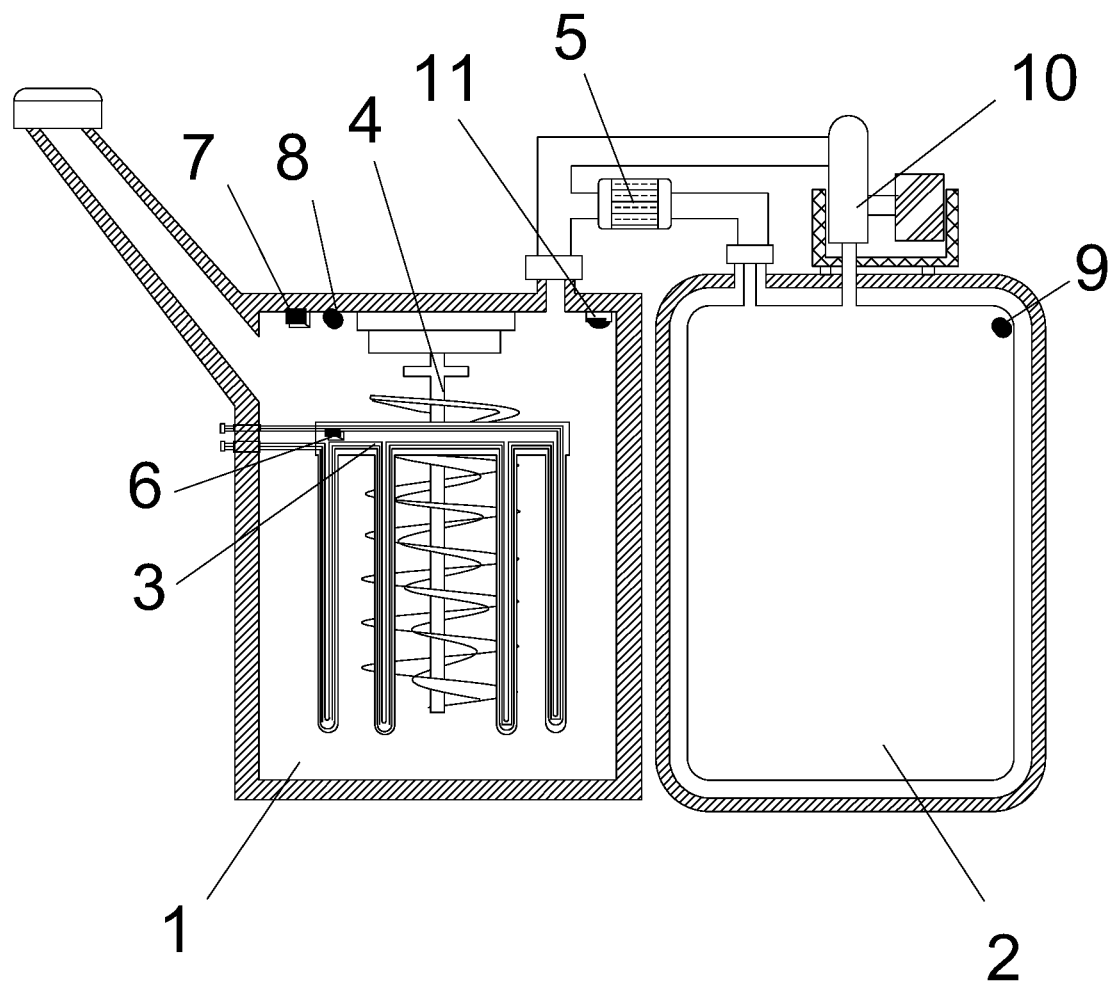
FIG. 7 is a schematic diagram of a device for supplying ammonia with solid adblue, according to the fourth embodiment.
Figure 8:
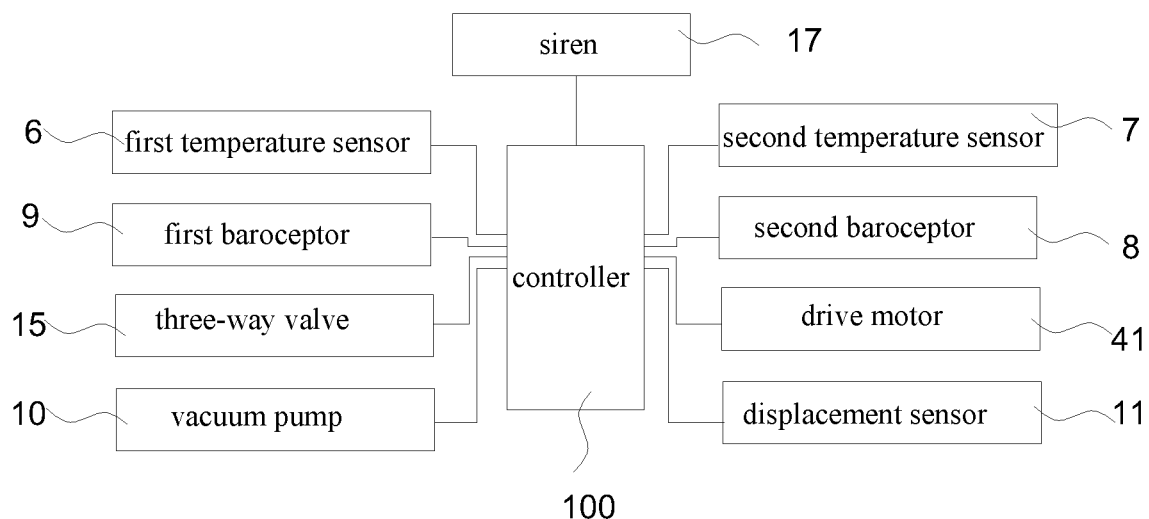
FIG. 8 is connection diagram of a control unit of a device for supplying ammonia with solid adblue, according to the fourth embodiment.

Referring to FIGS. 7 and 8, in the fourth embodiment, the device further includes a displacement sensor 11 and a siren 17. The displacement sensor 11 is used to test remain solid adblue inside of the urea tank 1, and to get a vertical distance d between the top of the urea tank 1 and the vertex of the solid adblue. The displacement sensor 11 is arranged on the roof of the inside-wall of the urea tank 1, and is connected with the controller 100 electrically. The controller 100 is used to receive the vertical distance d from the displacement sensor 11, and outputting decisions according to the vertical distance d. The controller 100 is further used to control the siren 17 whether to alarm according to the vertical distance d.

The controlling method of the controller 100 to the siren 17 is introduced as follows.

(1) receiving the vertical distance d from the displacement sensor 11.

(2) calculating the height of the solid adblue h, h=H-d, and comparing with a height h0 which is an empirical value.

When h≥h0, control the siren 17 to turn off.

When h<h0, control the siren 17 to turn on, and give a reminder of lacking of the solid adblue.

The vertical distance d from the displacement sensor 11 can be showed in a display instrument of the vehicle. The reminder of lacking of the solid adblue can be a sound, some light, and some display, or everything as long as the vehicle has. Therefore, a buzzer or a display of the vehicle can output the reminder of lacking of the solid adblue.

Two functions are added in the fourth embodiment. One function is how to test a remain solid adblue inside of the urea tank 1 is added in. The other function is whether alarming according to the remain solid adblue. Then operator is no need to check by himself, and is only need to receive the reminder of lacking of the solid adblue by the displacement sensor 11 and the siren 17.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for supplying ammonia with solid adblue, installed on a gas tank of a vehicle and integrated with the gas tank, comprising:
    a urea tank with an insulated shell, used to store the solid adblue to be sublimed by heating, wherein a first through-hole and an inlet are defined in the insulated shell of the urea tank; the inlet is used for putting the solid adblue in the urea tank; and a gas vent defined on the roof of the urea tank;
    a gasholder, interconnected with the gas vent by a tube, used for storing gas generated by the solid adblue with a sublimed way; a thermal insulation layer arranged in the shell of the gasholder; the gasholder being interconnected with an ejector which is used for supplying the sublimed adblue to clean vehicle exhaust;
    a heating apparatus, wherein, the heating apparatus comprises a first pipe for heating exhaust gas of the vehicle, a second pipe for heating the solid adblue electrically, a third pipe for controlling the temperature of the solid adblue, and media for controlling the temperature of the solid adblue; a chamber defined in the urea tank; the third pipe is a sealed pipe with a manageable temperature, and constituted by an annulus and a plurality of vertical tubes; one end of each vertical tube is fixed on the annulus, and interconnected with the annulus; the other end of each vertical tube extends vertically away from the annulus, and the annulus is set horizontally; the plurality of vertical tubes is on the same side of the annulus and arranged evenly around the annulus; a certain gap is set between each two neighboring vertical tubes; the media is filled in the chamber of the third pipe; the media being an azeotrope which is consisted of at least one material, and has a boiling point between 130-150° C.; the first pipe is used to heat exhaust gas and to transmit the vehicle exhaust; the first pipe is interconnected with the urea tank by the first through-hole; one end of the first pipe extends into the urea tank and is inside of the third pipe; the first pipe is interconnected with a second pipeline of the vehicle by a three-way valve, and the second pipeline is used to discharge the vehicle exhaust; the three-way valve is used to control the first pipe to let out the vehicle exhaust or used to let out the vehicle exhaust directly; the input of the three-way valve is interconnected with an entry end of the second pipeline; two outputs of the three-way valve are interconnected with an exit end of the second pipeline and an entry end of the first pipe respectively; an exit end of the first pipe extended to an exit end of the second pipeline; the second pipe is heated electrically by heating elements and used to heat the solid adblue; both of the first pipe and the second pipe intend inside of the urea tank by the first through-hole and coated by the third pipe;
    a mixing mechanism, used to stir the solid adblue and arranged on the roof of the urea tank; wherein, the mixing mechanism comprises a packing auger and a drive motor; the drive motor is arranged on the roof of the urea tank; one end of the packing auger is installed on the drive motor and rotated by the drive motor; the other end of the packing auger underlays the annulus, and surrounded by the plurality of vertical tubes; the solid adblue is elevated by the packing auger while rotated by the drive motor;
    a one-way valve, arranged on the gas vent of the urea tank, and used to control sublimed gas only to be transmitted from the urea tank to the gasholder;
    a first temperature sensor, set inside of the third pipe, and used to get a temperature T1 of the media inside of the third pipe;
    a second temperature sensor, arranged inside of the urea tank, and used to get a temperature T2 of the environment inside of the urea tank;
    a first baroceptor, set inside of the gasholder and used to get a pressure P1 of the gasholder; and
    a controller, connected to the second pipe, the three-way valve, the drive motor, the first temperature sensor, the second temperature sensor, and the first baroceptor; the controller having a controlling method which comprising:
    step S1: receiving the pressure P1 of the gasholder in real time, and deciding whether the solid adblue to be heated according to the pressure P1:
        (1) when P1≥p1, controlling the solid adblue out of heating, and returned to the step S1; and
        (2) when P1<p1, going to the next step S2; and wherein the pressure p1 is an empirical value and is also a minimum value that there is enough solid adblue for a vehicle running for a certain time; when the pressure P1 is lower the pressure p1, the gasholder is lack of solid adblue;

step S2: turning the first pipe on by the three-way valve, and turning the drive motor on;

step S3: receiving the temperature T1 of the media inside of the third pipe and the temperature T2 of the environment inside of the third pipe, then outputting decisions as follows:

step S31; with a given cycle period for heating, judging the temperature T1 and T2 whether are within a temperature range (t1, t2), t1≥130° C., t2≤150° C., and deciding as follows:

(1) when the temperature T1 within the temperature range (t1, t2), turning the first pipe on;

(2) when the temperature T2 without the temperature range (t1, t2), turning both the first pipe and the second pipe on;

step S32; when one of the temperature T1 and T2 more than the temperature-max t2, t2≤150° C., turning the first pipe off by the three-way valve, and/or turning the second pipe off; and step S33; when the temperature T1 lower than the temperature-min t1, t1≥130° C., turning the first pipe on by the three-way valve again, and returning to the step S31, otherwise going to the step S4; and Step S4: receiving the pressure P1 of the gasholder 2 in real time, and deciding whether the pressure P1 being equal to a pressure p2:

(1) when P1≥p2, turning the first pipe off by the three-way valve, and turning the drive motor off; and (2) when P1<p2, returning to the step S1.

2. The device according to claim 1, wherein the second pipe is shaped corresponding to the third pipe, the second pipe also comprises two parts according to the annulus and the plurality of vertical tubes; one part corresponding to the annulus is inside of the annulus, and the other part corresponding to the plurality of vertical tubes is inserted into the plurality of vertical tubes and is extended out of the plurality of vertical tubes; the second pipe is parallel to the first pipe.

3. The device according to claim 1, wherein the insulation interlayer comprises a foam material with low thermal conductance; a double layer structure with a vacuum interlayer is arranged in on the outside wall of the gasholder; the thermal insulation layer is covered over the outside of the gasholder, and the insulating material is foam material.

4. The device according to claim 1, further comprising:

a second baroceptor, inside of the urea tank and used to get a pressure P2 of the urea tank; and a vacuum pump, wherein an entrance of the vacuum pump is interconnected with the urea tank, and an exit of the vacuum pump is interconnected with the gasholder;

wherein the vacuum pump is used to transmit the sublimed gas from the solid adblue to the gasholder; both the second baroceptor and the vacuum pump are connected electrically to the controller and are controlled by the controller.

5. The device according to claim 1, further comprising:

a displacement sensor, used to measure remaining solid adblue inside of the urea tank, and to get a vertical distance d between the top of the urea tank and the vertex of the solid adblue; the displacement sensor being arranged on the roof of the inside-wall of the urea tank, and connected with the controller electrically; and a siren, connected with the controller electrically;

wherein the controller is used to receive the vertical distance d from the displacement sensor, and outputting decisions according to the vertical distance d; the controller is further used to control the siren whether to alarm according to the vertical distance d.

6. The device according to claim 5, wherein a controlling method of the controller for the siren comprises:

(1) receiving the vertical distance d from the displacement sensor; and (2) comparing the vertical distance d with a height h0 which is an empirical value;

when h≥h0, keeping the siren to turn off; and when h<h0, controlling the siren to turn on to remind lacking of the solid adblue.

7. The device according to claim 5, wherein the vertical distance d from the displacement sensor is showed in a display instrument of the vehicle; a reminder of lacking of the solid adblue is outputted by a buzzer or a display of the vehicle.

8. The device according to claim 1, wherein a pipeline is arranged in a inlet of the urea tank and extends up slantwise until the entrance of the vehicle; the top opening of the first pipeline is provided with a sealed cover body; both the inside wall of the urea tank and the gasholder, the surface of the packing auger, and the outside wall of the third pipe are coated by poly tetra fluoroethylene (PTFE) films.

* * * * *